United States Patent
Matthews et al.

(10) Patent No.: US 9,137,027 B2
(45) Date of Patent: Sep. 15, 2015

(54) BOOTSTRAPPING IN PEER-TO-PEER NETWORKS WITH NETWORK ADDRESS TRANSLATORS

(75) Inventors: Philip Matthews, Ottawa (CA); Eric Cooper, Kanata (CA); Alan B. Johnston, St. Louis, MO (US)

(73) Assignee: AVAYA CANADA CORP., Halifax, Nova Scotia (CA)

( * ) Notice: Subject to any disclaimer, the term of this patent is extended or adjusted under 35 U.S.C. 154(b) by 1578 days.

(21) Appl. No.: 12/527,960

(22) PCT Filed: Feb. 20, 2008
(Under 37 CFR 1.47)

(86) PCT No.: PCT/CA2008/000316
§ 371 (c)(1),
(2), (4) Date: Jun. 3, 2010

(87) PCT Pub. No.: WO2008/101329
PCT Pub. Date: Aug. 28, 2008

(65) Prior Publication Data
US 2012/0079031 A1   Mar. 29, 2012

Related U.S. Application Data

(60) Provisional application No. 60/902,338, filed on Feb. 21, 2007.

(51) Int. Cl.
*G06F 15/16*   (2006.01)
*H04L 12/18*   (2006.01)
(Continued)

(52) U.S. Cl.
CPC ............ *H04L 12/18* (2013.01); *H04L 29/1249* (2013.01); *H04L 61/256* (2013.01); *H04L 67/104* (2013.01); *H04L 67/1046* (2013.01)

(58) Field of Classification Search
CPC ... H04L 12/18; H04L 67/1046; H04L 67/104; H04L 29/1249; H04L 61/256
USPC ........................................................ 709/206
See application file for complete search history.

(56) References Cited

U.S. PATENT DOCUMENTS

2002/0143855 A1* 10/2002 Traversat et al. ............. 709/202
2004/0153858 A1   8/2004 Hwang
(Continued)

FOREIGN PATENT DOCUMENTS

WO   WO 2004/063843 A2   7/2004

OTHER PUBLICATIONS

Mahy et al. RFC 3891. "The Session Initiation Protocol (SIP) 'Replaces' Header". Sep. 2004. pp. 1-16.*
(Continued)

*Primary Examiner* — John Macilwinen

(57) ABSTRACT

A joining peer is bootstrapped into in a peer-to-peer (P2P) network in the presence of network address translators (NAT). A bootstrap peer is contact by the joining peer to establish a connection between the joining peer and an admitting peer in the peer-to-peer network. The joining peer receives an indication from the bootstrap peer that the connection between the joining peer and the admitting peer has been established with a message path through the bootstrap peer. The indication includes contact information for the admitting peer. The connection is them modified to remove all proxies therefrom.

23 Claims, 7 Drawing Sheets

(51) Int. Cl.
*H04L 29/12* (2006.01)
*H04L 29/08* (2006.01)

(56) References Cited

U.S. PATENT DOCUMENTS

2006/0075127 A1    4/2006   Juncker et al.

2007/0211705 A1*   9/2007   Sunstrum ...................... 370/356

OTHER PUBLICATIONS

Bryan et al. draft-willis-p2psip-concepts-03. "Concepts and Terminology for Peer to Peer SIP". Oct. 22, 2006. pp. 1-31.*
Rosenberg et al. RFC 3261. SIP: Session Initiation Protocol. Jun. 2002. pp. 1-269.*

* cited by examiner

US 9,137,027 B2

BOOTSTRAPPING IN PEER-TO-PEER NETWORKS WITH NETWORK ADDRESS TRANSLATORS

CROSS-REFERENCE TO RELATED APPLICATION

This application claims the benefit of U.S. Provisional application No. 60/902,338 filed on Feb. 21, 2007, incorporated herein by reference. This application is related to U.S. application Ser. No. 11/708,635, filed on Feb. 21, 2007, titled "Peer-to-Peer Communication System and Method", incorporated herein by reference.

FIELD OF THE INVENTION

The present invention relates to the joining of a peer to an overlay in a peer-to-peer network.

BACKGROUND OF THE INVENTION

Network Address Translators (NAT) causes well-known difficulties for peer-to-peer (P2P) communication since the peers involved in the network may not have a globally valid IP (Internet Protocol) address at which they are reachable. In particular, current Internet address architecture consists of a global address space (i.e., public IP addresses) and many private address spaces (i.e., private IP addresses) multiplexed to a single public IP address by NATs. Only peers (also termed nodes, clients, etc.) in the global address space can be easily contacted from anywhere in the network because they have unique, globally routable IP addresses. Peers on private sub-networks can connect to other peers on the same private sub-network and they can usually open TCP (Transmission Control Protocol) or UDP (User Datagram Protocol) connections to established peers in the global address space. However, since peers on a private sub-network are multiplexed to a smaller number of public IP addresses, it is difficult for two peers on different private sub-networks to contact each other directly as a NAT receiving an incoming message may be unaware of the peer for which the message is destined. In particular, NATs allocate temporary public endpoints for outgoing connections and translate the addresses and port numbers in packets comprising those sessions, while generally blocking all incoming traffic unless otherwise configured.

Many techniques have been proposed to overcome the direct peer-to-peer communication difficulties but are not typically universally applicable since NAT behavior is not standardized. Some techniques require a public server at a known globally reachable IP address which aids two peers in establishing a direct connection. Other solutions involve relaying all data through a server, which adds bandwidth costs and increases latency detrimental to conversational VoIP (Voice over IP) applications for example. Other NAT behavior-based solutions fail to preserve enterprise security policies and break end-to-end transparency.

P2P overlay networks are virtual networks that may incorporate peers on multiple sub-networks, each of which may be protected by a NAT (e.g. a multiple site corporate LAN). If a peer wishes to join an existing P2P overlay network it locates and contacts one or more peers in the overlay and then exchanges messages with these peers. This process can be complicated by the presence of NATs separating the sub-networks in the overlay.

DETAILED DESCRIPTION

Figure 1:
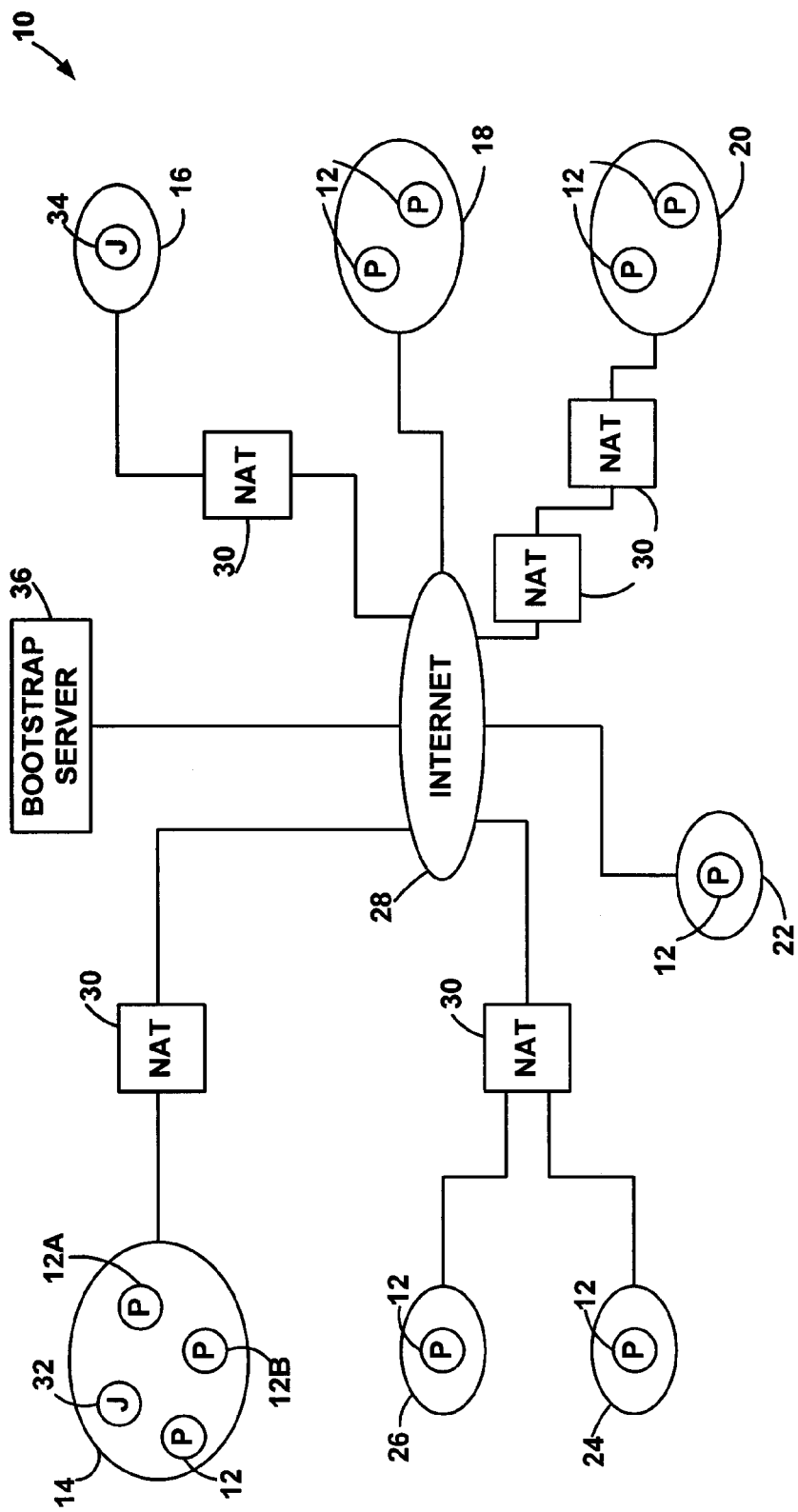
FIG. 1 illustrates a schematic representation of a peer-to-peer network having a plurality of peers to be structured in an overlay network according to embodiments of the present invention.

FIG. 1 illustrates a network topology 10 including a representative group of peers 12 that are to be structured in a P2P overlay network (simply referred to as an overlay). An overlay is effectively a virtual network that is built on top of another network. Nodes/peers in the overlay are connected using virtual or logical links, each of which corresponds to a path, typically through many physical links, in the underlying network.

The network topology 10 of FIG. 1 includes a series of subnets (sub-networks) 14, 16, 18, 20, 22, 24 and 26, each containing one or more peers 12, and the Internet 28. Each peer 12 in subnets 18 and 22 use public IP addresses since they are part of the global address space. Each peer 12 in subnets 14, 16, 20, 24 and 26 use private IP addresses since NATs (Network Address Translator) 30 are located between the respective subnet and the Internet 28. Subnets 24 and 26 share a single NAT 30. Subnet 20 illustrates a cascading NAT arrangement where two NATs 30 are located between the subnet 20 and the Internet 28.

Establishing connections between peers in a network through NATs is commonly referred to as NAT traversal. A number of known NAT traversal protocols based on NAT behavior include: Universal Plug and Play (UPNP); NAT Port Mapping Protocol (NAT-PMP); Simple Traversal of UDP over NATs (STUN); Traversal Using Relay NAT (TURN); Simple Middlebox Communication Protocol (SIMCO); Managed Objects for Middlebox Communication (MIDCOM); Realm-specific Internet Protocol (RSIP); Application Listener Discovery (ALD); Network Layer Signaling Transport Layer (NLS); Authorized IP Firewall Control Application (AFWC); Interactive Connectivity Establishment (ICE) and UDP hole punching.

Overlay Topologies

An overlay connecting the peers 12 in the network topology 10 in FIG. 1 may take a number of configurations taking into account the number of peers 12 in the overlay, the amount of traffic expected to travel between peers 12, etc.

A generalized overlay topology uses a set of connections to ensure that messages can be transmitted between any arbitrary pair of peers. The specific number of connections used is based on the type of mechanism used for routing messages between peers in the network. Generally, when more connections are present, routing can be performed with fewer hops. However, each connection consumes resources (such as memory, computing cycles on the peer itself, bandwidth on the underlying network, etc.) so reducing the number of connections without degrading routing efficiency is a factor in overlay design.

In addition to the connections created based on routing design, further connections may be useful for application specific purposes. For example, connections in an overlay may be created to ensure that it is both possible and reasonably efficient to route message between any arbitrary pair of peers in the overlay. However, if two peers need to exchange a large volume of messages or need to exchange messages frequently or at regular intervals, it may be beneficial to add a new connection directly between these two peers to optimize these exchanges.

A peer protocol is used by peers to maintain an overlay and may be used by peers to join the overlay. In order to work through NATs, a "control connection" between two peers is set up over which the peer protocol can run, which is also the transport connection (e.g. TCP, UDP, or some other transport). The peers at each end of the control connection establish this connection and then take steps to maintain it in the presence of NATs (e.g., by sending keep-alive messages). The peer protocol may provide a way to transport connection messages, or there may be a way to multiplex connection messages with the peer protocol messages on the same connection. Thus, connection messages may be sent along control connections for the purposes of setting up and tearing down other control connections in the overlay. The protocol used to set up these connections must be able to set up and either tear down or time out a connection. Preferably, the connection protocol also enables modification of connections, provides security mechanisms and mechanisms to set up connections through NATs. For example, Session Initiation Protocol (SIP) may be used to establish connections over which the peer protocol runs while the peer protocol may be, for example, SDP (Session Description Protocol).

Joining the Network

New connections are established between peers when a peer joins an existing overlay. However, not every peer is necessarily directly connected to every other peer in the overlay, so a bootstrapping process is used for joining a peer to the overlay.

A peer that serves as the initial point of contact into the overlay network is known as a bootstrap peer. With the help of the bootstrap peer, the joining peer can locate and contact the other peers in the overlay. However, it may be more efficient for the bootstrap peer to refer the joining peer on to another peer who is better able to help the joining peer join the overlay. This second peer, called the admitting peer, might be, for example, a neighbor of the joining peer in the overlay. In those cases where the referral is not done, the first peer simply plays both roles: bootstrap peer and admitting peer. The joining peer and the admitting peer may both be behind different NATs, in which case an out-of-band signaling protocol (e.g. SIP), may be used to establish the connection.

The bootstrap process for the overlay establishes a control connection to work through any intervening NATs between the joining peer and the admitting peer. Once this connection is established, the joining peer can communicate with the admitting peer using the peer protocol that maintains the overlay and completes the process to become a fully functional member of the overlay.

The bootstrap process removes intermediate proxies from the signaling path between the joining peer and the admitting peer. In other words, though the initial signaling likely needs to go via intermediaries, these intermediaries may be removed from the path so that the signaling can go directly between the joining peer and the admitting peer. If the intermediate proxies are stateful, then leaving these proxies in the signaling path consumes extra resources. If the connection is long-lived, then leaving these proxies in the signaling path means that the connection depends on their continuing availability. Thus, the intermediaries may be removed from the signaling path.

The load on the bootstrap peers may be spread as evenly as possible; however, if an attempt through one bootstrap peer fails, it may be possible to iterate through a number of other bootstrap peers. For example, the bootstrap process might choose bootstrap peers at random, or round-robin through them. Spreading the load on the bootstrap peers minimizes that the burden of being a bootstrap peer, which increases the choice of peers that can serve as bootstrap peers.

Figure 2:
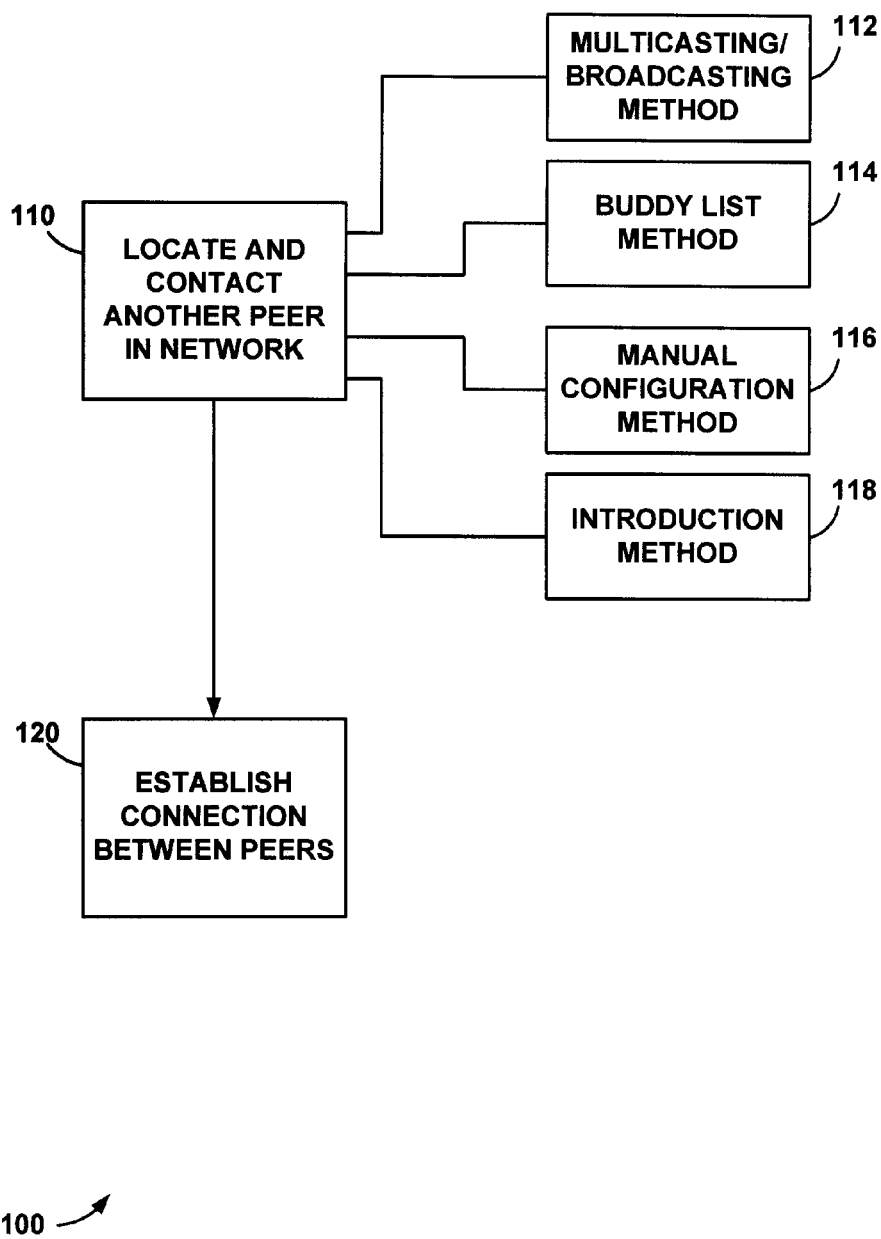
FIG. 2 illustrates a flow chart representing a process of adding a new peer to a network according to an embodiment of the present invention.

FIG. 1 illustrates two joining peers 32 and 34; one of which 32 is in the same subnet 14 as peers 12 that are already in the overlay while the other joining peer 34 is behind a NAT 30 and is in a subnet 16 with no peers already in the overlay. FIG. 2 is a flow chart illustrating an overview of a process 100 of one of the joining peers 32, 34 joining the overlay.

The joining peer 32, 34 locates and contacts another peer that is in the overlay (step 110). The joining peer 32, 34 locates and contacts another peer using at least one of a multicasting/broadcasting method 112, a buddy list method 114, a manual configuration method 116 and/or a bootstrap server method 118. The process used may depend on the situation of the joining peer 32, 34 with respect to peers 12 in the overlay. For example, joining peer 32 may use the multicasting/broadcasting method 112 to contact peers 12 in the same subnet 14 whereas joining peer 34 may use the bootstrap server method 118 to contact a bootstrap server 36 to establish a connection with a peer 12 in the overlay. Some of these processes may be used together in harmony (e.g. the joining peer 32 may try the multicast process and then try the bootstrap server process if the multicast process fails.) These approaches are described in further detail below.

In the multicasting/broadcasting method 112, peer 32 transmits a "hello, is anyone there?" multicast/broadcast message and any peer that is in the overlay can reply. This process works well for contact peers 12 in the same subnet. The reply from peer 12B (a bootstrap peer) to peer 32 contains information to allow peer 32 to contact one (or more) of the peers 12A (admitting peer) in the overlay to request admission thereto. Alternatively, peers 12 (including peer) that are currently in the overlay can periodically send out multicast/broadcast messages advertising (i.e., an advertising message) their existence, which would allow peer 32 to discover peers in the overlay by listening for multicast/broadcast messages. The advertising message also contains information to allow peer 32 to contact one (or more) of the peers in the overlay to request admission thereto.

The buddy list method 114 can be used if peer 32, 34 was previously part of the overlay but was disconnected for a period of time (e.g., phone was shut down or removed from the overlay). Peer 32, 34 can be configured to remember the address and port information of some peers 12 in the overlay in a buddy list when it disconnects and can then attempts to contact a peer 12 on its buddy list when it wants to rejoin the overlay. The peer 32, 34 will be able to rejoin the overlay if at least one of the peers 12 in the buddy list can be contacted and is still a member of the overlay.

In the manual configuration method 116 the peer 32, 34 is configured with address and port information of one of the peers 12 in the overlay. The address and port information represents the public IP address and port of a peer 12 that the NAT 30 (if any) assigns. If the NAT 30 has a filtering behavior (address restricted) then the one peer 12 is also configured with the address and port information of the peer 32, 34, for example.

The bootstrap server method 118 involves the use of a bootstrap server 36 or bootstrap peer that represents a node with a public IP address and, optionally, a DNS (Domain Name System) entry. The bootstrap server 36 need not be part of the overlay per se but is used for introduction/bootstrapping of new peers in the overlay. For example, the subnet 14 may elect/designate at least one of the peers in the overlay (such as peer 12B) to maintain a connection to the server 36. When peer 32, 34 contacts the server 36, peer 32, 34 is given the address and port information (i.e., mapped IP address) of at least one elected peer and the server 36 forwards the address and port information of the peer 32, 34 to the selected peer (admitting peer) to enable admission to the overlay. The bootstrap server method 118 is particularly useful in a situation where the joining peer 34 is in a subnet 16 with no other peers in the overlay.

Any of the above methods 112, 114, 116, 118 may use any of a number of NAT traversal techniques for help with setting up a control connection through any NATs that may lie between the joining peer and the admitting peer (e.g. UPNP, ICE, etc.).

After peer 32, 34 has located and contacted the admitting peer 12A in the overlay, a connection is established between peer 32, 34 and the admitting peer 12A using a NAT traversal protocol (step 120).

At this point, the new connection has been established, but communication for the connection still goes through the intermediate proxies (the bootstrap server and/or bootstrap peer). If one of these intermediaries was to crash or leave the overlay, then the signaling channel between the joining peer 32, 34 and the admitting peer 12A would be broken. To handle this case, one endpoint (usually the joining peer) may send a new message to the other endpoint down this connection between the two to replace or tear down this old connection and create a new connection directly between the joining peer 32, 34 and the admitting peer 12A. For example, if SIP is used as the connection protocol then an INVITE with a Replaces header may be used for this purpose.

Multicast/Broadcasting Method

The multicast/broadcasting method 112 process allows the joining peer 32 to locate a bootstrap peer 12B on the same subnet 14. It will also work between subnets if the two subnets are joined in a same multicast domain—typically, these will be adjacent subnets operated by the same organization. When a peer joins the overlay it may decide that it can be a bootstrap peer (i.e. it may meet specified criteria for a bootstrap peer, such as having a predefined bandwidth capacity and/or processing ability). The peer then declares itself a bootstrap peer.

Figure 3:
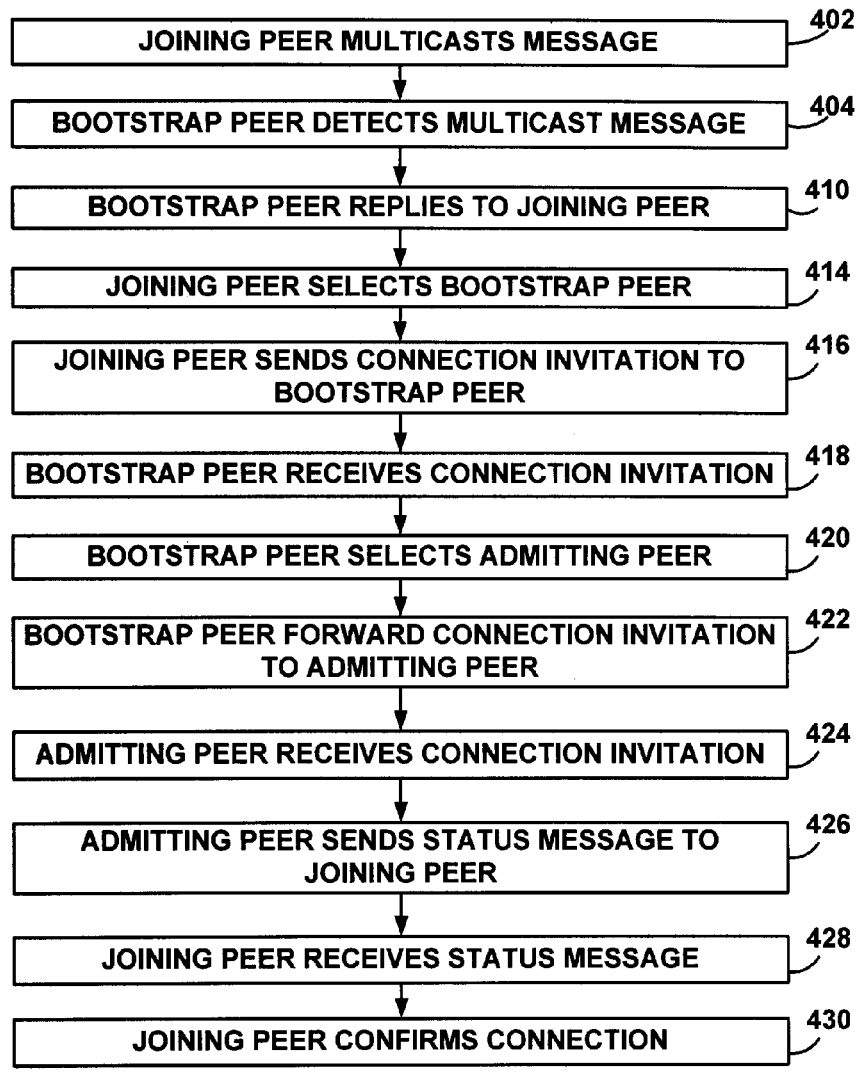
FIG. 3 illustrates a multicast process for a bootstrapping process.

The multicast/broadcasting method 112 shown in FIG. 3 starts with the joining peer multicasting a message to a multicast address (step 402) requesting that a bootstrap peer from the overlay the joining peer wishes to join contact the joining peer. The message is addressed to a bootstrap service and specifies the name of the overlay the peer wishes to join. This message is not addressed to a specific bootstrap peer but rather to a bootstrap service whereby any peer that may be a bootstrap peer can access this message. The joining peer hopes that by multicasting the message it will be picked up by a bootstrap peer.

Peers willing to act as bootstrap peers listen on this multicast address and detect the arrival of messages (step 404). If a message arrives at the multicast address requesting the services of a bootstrap peer for the overlay, the peer willing to act as a bootstrap peer replies (step 406). Since there may be multiple peers willing to act as a bootstrap peer, each peer may wait a random time interval after detecting the multicast message before sending their reply in order to spread out the replies. Alternatively, the peers may each wait a random time interval after detecting the multicast message and only send a reply if they detect that no other replies are being or have been sent.

If these conditions are satisfied, then the bootstrap peer replies to the joining peer (e.g. with an ok or moved message) (step 410). In either case, the bootstrap peer includes an address at which it can be reached in the reply. This address may be a unicast address that is reachable from any node in the multicast domain.

The joining peer receives zero or more of these replies (step 412). The joining peer selects one of the replies and uses the sender of that reply as the bootstrap peer (step 414).

The joining peer then forms a connection invitation message and unicasts it to the selected bootstrap peer (step 416). This connection invitation message is arranged such that an admitting peer (the eventual recipient of the message) can recognize that it is a request for a control connection. The message is addressed to the selected bootstrap peer. The joining peer may indicate in the invitation message that the bootstrap peer should proxy the invitation onward to an admitting peer.

The bootstrap peer receives the invitation message (step 418) and selects a peer to act as the admitting peer (step 420). When the bootstrap peer receives the invitation, it selects a peer in the overlay to act as the admitting peer. One example of how the bootstrap peer might select an admitting peer is to determine the nearest neighbor to the joining peer to be the admitting peer.

A bootstrap peer may select itself as the admitting peer, in which case the connection invitation is handled as described below. If the bootstrap peer is not the admitting peer then the bootstrap peer then forwards the connection invitation to the admitting peer (step 422) by proxying the invitation. This may be done by using the peer protocol's ability to transport messages from one peer to another. The invitation message goes hop-by-hop through some intermediate peers until it reaches the admitting peer. The invitation message might be encapsulated in a peer protocol message, or may be multiplexed and sent un-encapsulated along peer protocol links. The bootstrap peer does whatever is appropriate to force future requests in the dialog to pass through the bootstrap peer—failure to do so would likely mean that future requests would not make it through intervening NATs.

When the admitting peer receives the invitation message (step 424), it recognizes that it is for a control connection. The admitting peer sends a status message to the joining peer indicating that a connection between two has been established (step 426). The peer protocol may define how responses to requests are sent and routed through the overlay. This status message is sent from the admitting peer to the bootstrap peer who forwards it to the joining peer.

On receipt of the status message (step 428) from the admitting peer, the joining peer confirms with the admitting peer that a connection between them has been established (step 430). A message with this confirmation is sent (through the bootstrap server if present) to the bootstrap peer, which forwards it through the overlay to the admitting peer.

Multicast Method Example

Figure 4:
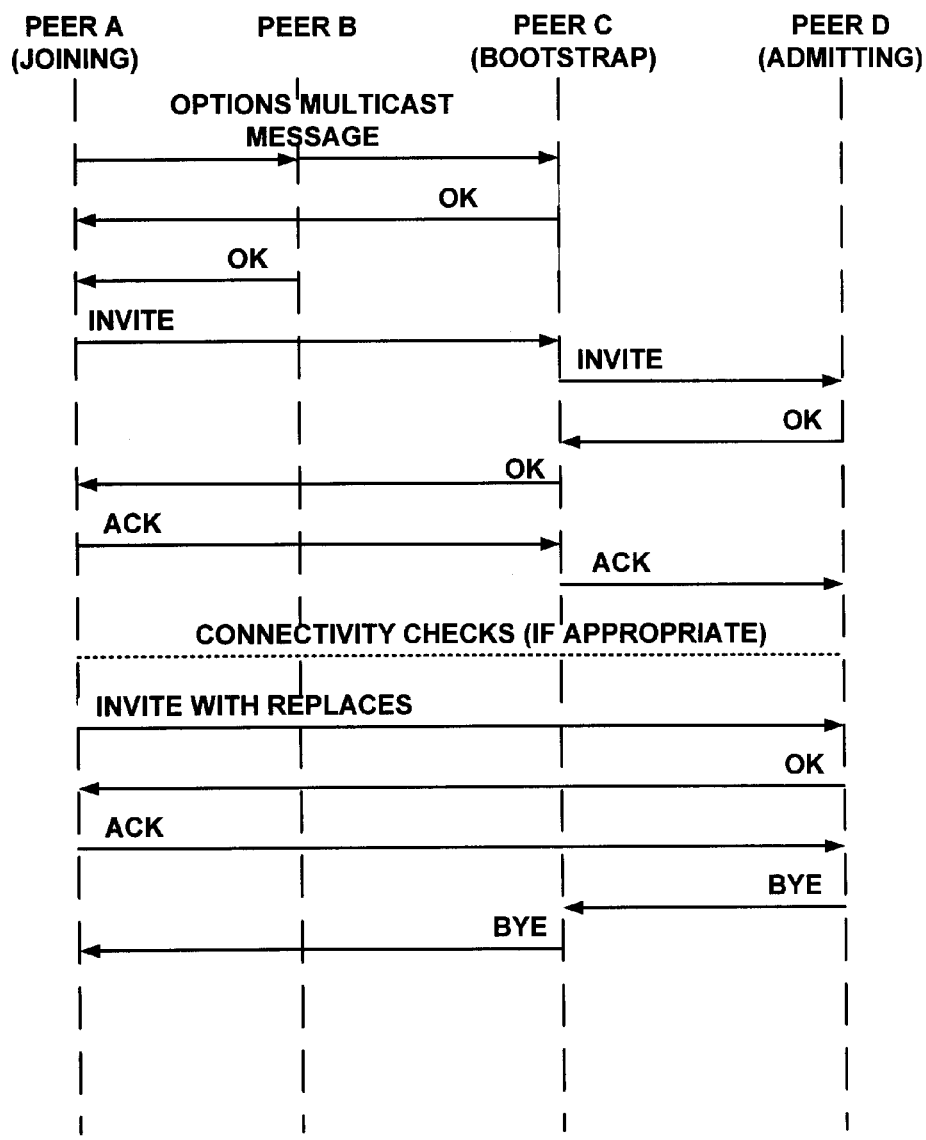
FIG. 4 illustrates an example of a signaling flow between peers in the multicast process.

FIG. 4 illustrates an example of a signaling flow using SIP for the multicast method. URIs are used for addressing and conveying information in the SIP messages. Three general types of URIs are used, each including different information. URI format 1 includes a specific peer in a specific overlay (and optionally an IP address associated with the peer). URI format 2 indicates a bootstrap service for a specific overlay but does not specify a peer. URI format 3 indicates a bootstrap service for a specific overlay as provided by a specific peer (and optionally an IP address associated with the peer). Both URI formats 2 and 3 indicate that the goal of the request is to set up a connection to bootstrap (or admit) a joining peer into the overlay.

In this multicast method example, a Peer A ("the joining peer") wants to join a particular overlay. Peer A multicasts out an options message. For this message, the recipient (e.g. To) header and request URI may use URI format 2 that specifies the "bootstrap" service and the name of the overlay, but does not specify a particular peer.

The joining peer lists its peer URI (e.g. URI format 1) in the sender (e.g. From) and contact fields of the message.

Peers B and C, which happen to be on the same subnet as A, are already members of the overlay in question, and are listening on the multicast address. When the options message arrives, peers B and C respond to the options request. Prior to responding to the options message, peers B and C may verify that the message is addressed to the bootstrap service and the overlay for which Peers B and C are bootstrap peers. By chance, peer C responds first, and is thus selected as the bootstrap peer for the rest of the exchange. The response from both peers B and C include, in the Contact header of their response message, a URI specifying itself as the peer (e.g. URI format 3). The URI includes a unicast address at which the bootstrap peer can be reached. This unicast address is reachable from any node located in the multicast domain. The bootstrap peer does not include URIs of other peers unless the bootstrap peer knows that those peers are currently members of the overlay and are willing to act as bootstrap peers.

Peer A selects a contact URI from the reply from peer C and unicasts an invitation message to peer C. Peer A sends peer C an invitation message perhaps using URI in the recipient header of the bootstrap service but not a specific peer for the overlay (e.g. URI format 2), and a URI in its request URI specifying the selected bootstrap peer (e.g. URI format 3). The URI of the joining peer (e.g. URI format 1) is placed in the sender and contact headers of this invitation message. To indicate that the bootstrap peer should proxy the invitation message to an admitting peer, the joining peer may include a Request-Disposition header with a "proxy" directive in the invitation message.

Based on peer A's peer-id, peer C decides that peer D, rather than itself, is the best peer to help peer A join the overlay. Thus peer C forwards the invitation message to peer D ('the admitting peer') through the existing connections in the overlay.

Peers A and D complete the invitation message transaction, and then, depending on the NAT traversal technique being used, connectivity check may be performed. These two steps may be done in parallel. Once a working path for the peer protocol connection is selected, peer A sends an invitation message on the working path to establish a new dialog between peers A and D, and causes peer D to send a bye message for the old dialog.

The invitation message may contain a replaces header such as described in "The Session Initiation Protocol (SIP) "Replaces" Header" R. Mahy, B. Biggs, R. Dean. RFC 3891, September 2004, http://www.ietf.org/rfc/rfc3891.txt?number=3891 (accessed on Feb. 19, 2007), incorporated herein by reference, that specifies the dialog being replaced. The replaces header may contains the call-id, to-tag, and from-tag of the dialog established by the initial invitation message. The invitation message contains an updated offer. This invitation message can serve both to carry the replace and to carry the updated offer.

Further implementation specific details of the multicast method using SIP can be found in "Bootstrap Mechanisms for P2PSIP" E. Cooper, A. Johnston, P. Matthews, Feb. 24, 2007, http://tools.ietf.org/html/draft-matthews-p2 psip-bootstrap-mechanisms-00, (accessed on Feb. 14, 2008).

Bootstrap Server Method

A bootstrap server is a registrar and proxy, typically located in the public Internet that acts as an intermediary to introduce the joining peer to a bootstrap peer. The bootstrap server may or may not be part of the overlay but is simply a well-known node that acts as an "introduction service." The bootstrap server may act as either a stateful or stateless proxy. Acting as a stateless proxy may provide scalability advantages. The overlay may use multiple independent bootstrap servers at the same time, and a single bootstrap server may serve multiple independent overlays at the same time. Peers know the URL of one or more bootstrap servers (e.g. through configuration).

Figure 5:
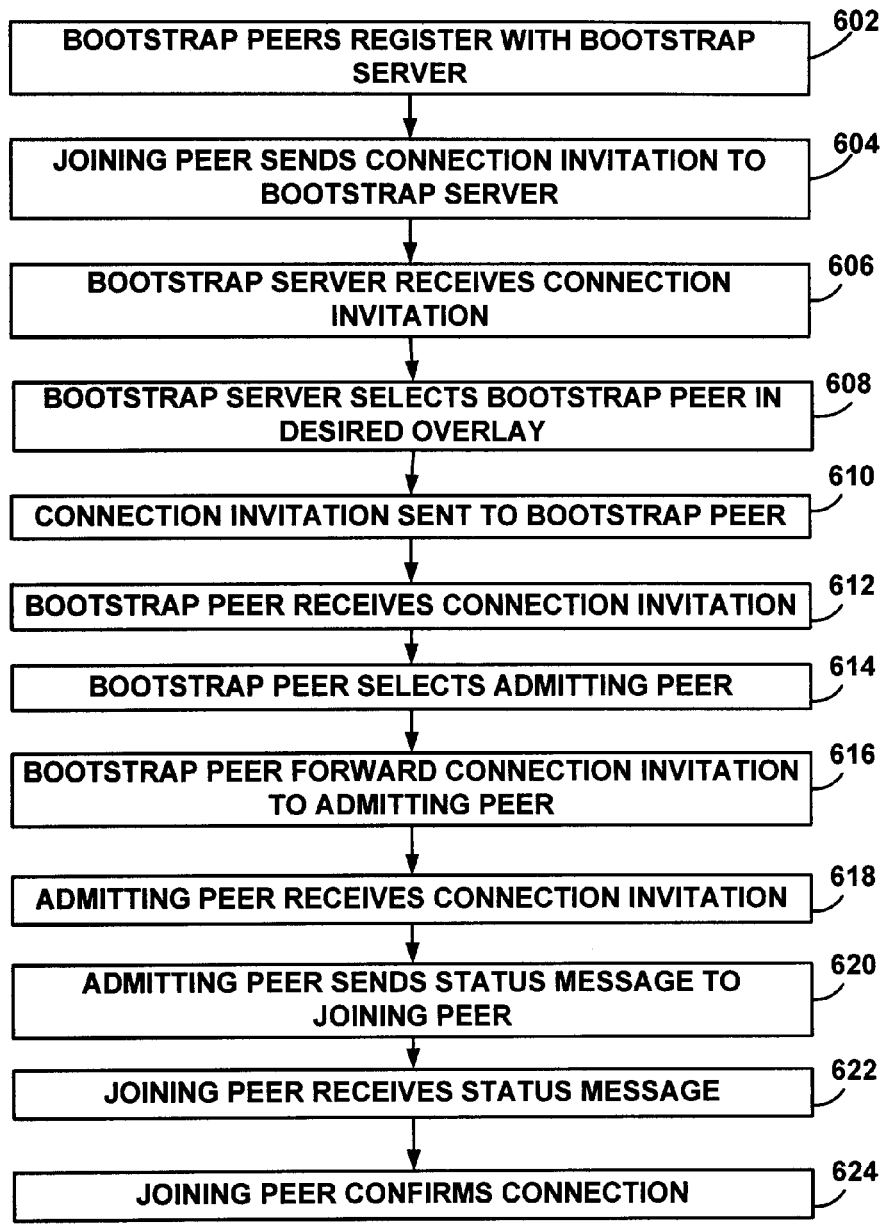
FIG. 5 illustrates a bootstrap server process for a bootstrapping process.

The bootstrap server method 118 shown in FIG. 5 begins with one or more bootstrap peers registering (step 602) with the bootstrap server. Each peer registers as the to pseudo-user "bootstrap-peer" and specifies the name of the overlay with which it is associated. The peers of an overlay select one or more peers to register with a given bootstrap server. The set of peers selected to register with one bootstrap server may be different than the set selected to register with a different bootstrap server. Each bootstrap peer learns contact information for each bootstrap server it is to contact. For each bootstrap server and bootstrap peer combination, the peer registers as a bootstrap peer for the overlay.

A peer that wishes to join the overlay sends a connection invitation message (step 604) to a bootstrap server addressed to "bootstrap-peer" and specifying the name of the overlay it wishes to join. The joining peer may indicate in the invitation message that the bootstrap server should proxy the invitation message onward to a bootstrap peer. The joining peer may try to contact different the bootstrap servers in some unspecified order until the peer succeeds in locating a server that knows about the overlay.

The bootstrap server receives the invitation message (step 606) and if the bootstrap server knows of one or more bootstrap peers in that overlay, it selects one (step 608). The bootstrap server proxies the connection invitation message onward to a bootstrap peer (step 610). The bootstrap server checks to see if it has one or more bootstrap peers registered for the given overlay. If it does, it selects one of these peers and forwards the invitation message to it. If there are multiple bootstrap peers registered for the same overlay, the proxy selects one of these peers in such a way that subsequent invitation messages for unrelated dialogs are likely to select a different bootstrap peer. One way this selection might be done is to hash on the contents of the sender and call-ID headers of the connection invitation message and use this hash value to select the bootstrap peer. This approach will select the same bootstrap peer for all transactions within the same dialog, but will usually select a different bootstrap peer for different dialogs.

The goal is to spread the load across bootstrap peers so that no bootstrap peer gets overloaded. This enables even less-capable peers can serve as bootstrap peers. In addition, this allows an overlay to select only a small number of bootstrap peers to register with the bootstrap server, thus reducing the load on the bootstrap server. The same bootstrap peer is selected for all transactions within the same dialog, but a different bootstrap peer is selected for different dialogs.

In many situations where either the joining node or the bootstrap peer are behind NATs, the bootstrap server remains in the path of future transactions on this dialog so that the messages can traverse the intervening NATs.

The bootstrap peer receives the invitation message (step 612) and, in turn, selects a peer to act as the admitting peer (step 614). A bootstrap peer may select itself as the admitting peer, in which case the invitation message is handled as described below.

The bootstrap peer proxies the invitation message to the admitting peer (step 616). The bootstrap peer then forwards the connection invitation message to the admitting peer, using the peer protocol's ability to transport messages from one peer to another. The invitation message goes hop-by-hop through some intermediate peers until it reaches the admitting peer. The invitation message might be encapsulated in a peer protocol message, or may be multiplexed and sent un-encapsulated along peer protocol links. The bootstrap peer indicate in the invitation message that future requests in the dialog are to pass through the bootstrap peer so that future requests make it through intervening NATs.

When the admitting peer receives the invitation message (step 618), it recognizes that it is for a control connection. The admitting peer sends a status message to the joining peer indicating that a connection has been established between them (step 620). The peer protocol may define how responses to requests are sent and routed through the overlay. Once the response gets back to the bootstrap peer, the response is back to the joining peer—in the case of the bootstrap server method, this means that the response is routed back through the bootstrap server.

On receipt of the status message (step 622), the joining peer sends an acknowledge message in response (step 624). The acknowledge message is sent (through the bootstrap server if present) to the bootstrap peer, which forwards it through the overlay to the admitting peer.

Bootstrap Server Process Example

Figure 6:
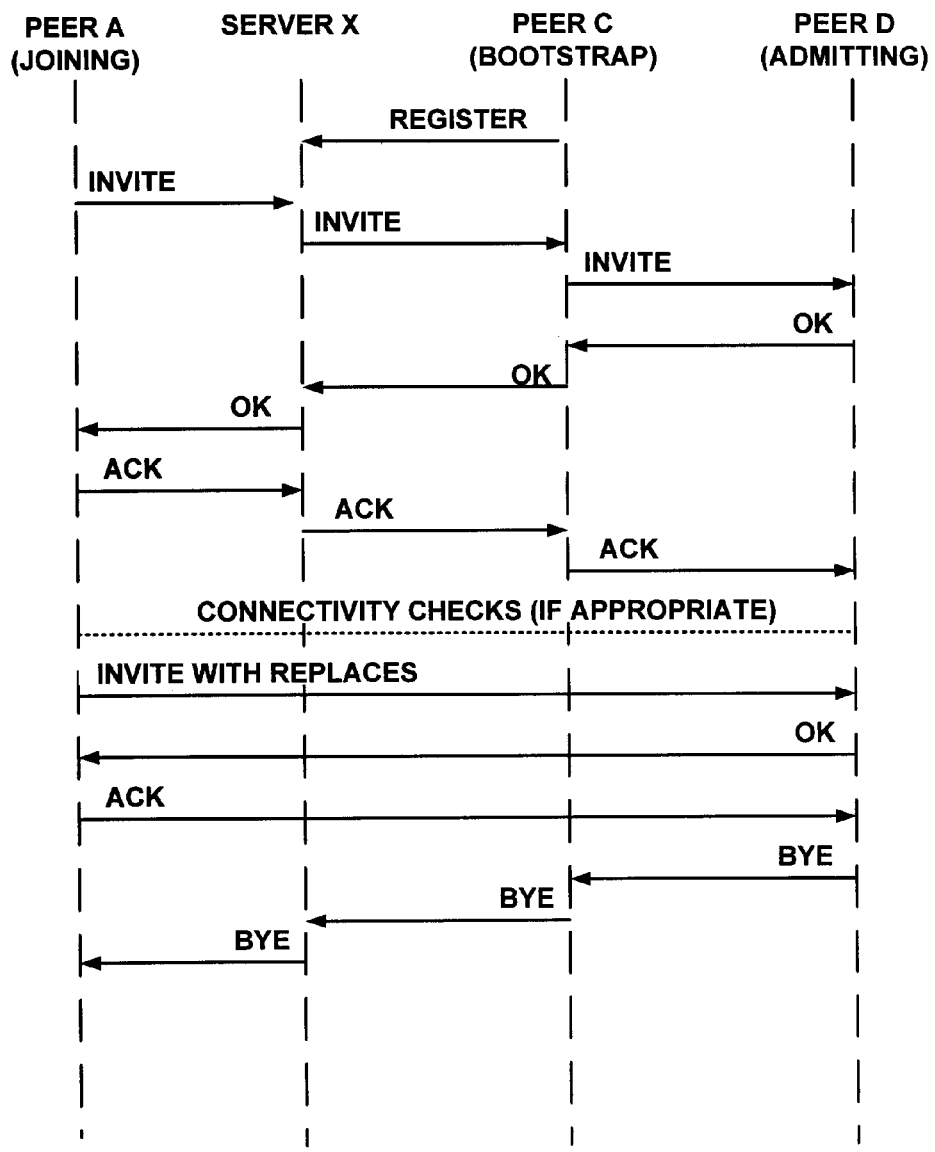
FIG. 6 illustrates an example of a signaling flow between peers in the bootstrap server process.

FIG. 6 illustrates an example of a signaling flow using SIP for the bootstrap server method. URIs are used for addressing and conveying information in SIP messages. The URIs used in this example may take the same format as the URIs described in connection with the multicast method example. A server X (a proxy and registrar) acts as a bootstrap server for a variety of different overlays. A URL for server X is known, through configuration, to a variety of nodes, including those interested in forming an overlay "O". Both the registrar and proxy understand the URI format. The registrar supports multiple registrations for a bootstrap peer for a given overlay.

At the start of this example, peer C, which is already a member of overlay "O", registers with server X as a bootstrap peer for the overlay. This may be done with a register message where the recipient and sender headers contain a URI where overlay "O" is specified but a specific peer is not (e.g. URI format 2), the contact header contains a URI that specifies a specific bootstrap peer (e.g. URI format 3), and the request URI contains the URI used to reach the bootstrap server. As part of the registration process, the peer may use the mechanisms specified in "Managing Client Initiated Connections in the Session Initiation Protocol (SIP)", Jennings, Ed., R. Mahy, Ed., Jan. 7, 2007, http://tools.ietf.org/wg/sip/draft-ietf-sip-outbound/(accessed on Feb. 19, 2007), incorporated herein by reference, to establish and keep a connection to the bootstrap server alive through any intervening NATs. Peer A decides to join the overlay. Peer A sends an invitation message to server X specifying overlay "O", and server X proxies this invitation message onward to peer C. The recipient header of the invitation message may contain a URI specifying the overlay but not the bootstrap peer (e.g. URI format 2). The sender and contact headers may contain a URI specifying the joining peer (e.g. URI format 1). Since the joining peer may be located behind a NAT, the invitation message may include the "rport" parameter defined in "An Extension to the Session Initiation Protocol (SIP) for Symmetric Response Routing", J. Rosenberg, H. Schulzrinne, RFC 3581, August 2003, http://www.ietf.org/rfc/rfc3581.txt (accessed on Feb. 19, 2007), incorporated herein by reference. For each bootstrap server, the peer may use standard SIP mechanisms to locate the proxy portion of the bootstrap server, and sends the invitation message to it.

To indicate that the bootstrap peer should proxy the invitation message to a bootstrap peer, the joining peer may include a Request-Disposition header with a "proxy" directive in the invitation message.

Upon receipt of the invitation message, the bootstrap server handles this message using known proxy procedures. The bootstrap server checks to see if there are any peers registered for the specified overlay. If there are registered peers then one is selected and the invitation message is forwarded to the selected peer. The peer selection is handled so as to spread the load across multiple bootstrap peers (if available).

When peer C receives the invitation message, it decides, based on A's peer-id (given in the message), that peer D is the best peer to help peer A join the network. Thus it forwards the invitation message to peer D (through the existing connections of the overlay).

In many situations where the joining peer and/or the bootstrap peer are behind NATs, the bootstrap server remains in the path of future communications to ensure that the message can traverse the intervening NATs. In this case, the bootstrap server adds a Record-Route header to the invitation message.

As in the multicast example, peers A and D complete the invitation message transaction and then select a working path. Peer A then sends an invitation message with a replace header on the working path. This establishes a new dialog between peers A and D, and causes peer D to send a bye message for the old dialog.

Further implementation specific details of the bootstrap server method using SIP can be found in "Bootstrap Mechanisms for P2PSIP" E. Cooper, A. Johnston, P. Matthews, Feb. 24, 2007, http://tools.ietf.org/html/draft-matthews-p2 psip-bootstrap-mechanisms-00, (accessed on Feb. 14, 2008).

Procedures Common to the Multicast and the Bootstrap Server Methods

The bootstrap peer in both the multicast and the bootstrap server methods select an admitting peer and forward the invitation message thereto. Before doing so the bootstrap peer may add a Record-Route header to the message forcing future messages through the bootstrap peer so that future requests pass through intervening NATs. The admitting peer receiving the invitation message recognizes that it is an invitation to set up a control connection from the format of the Request URI. The admitting peer sends a status message indicating that the connection was successfully established and the joining peer acknowledges this. Both of these message travel along the same path as the original invitation message because of the Record-Route header added to the original invitation message.

Associated with the invitation transaction there may is an offer-answer exchange in which the joining peer and the admitting peer negotiate parameters for the resulting peer protocol connection. The offer and answer contains a set of candidates (e.g. UDP candidates, TCP candidates, or other candidate types) on which protocol(s) the peer protocol runs on top.

Figure 7:
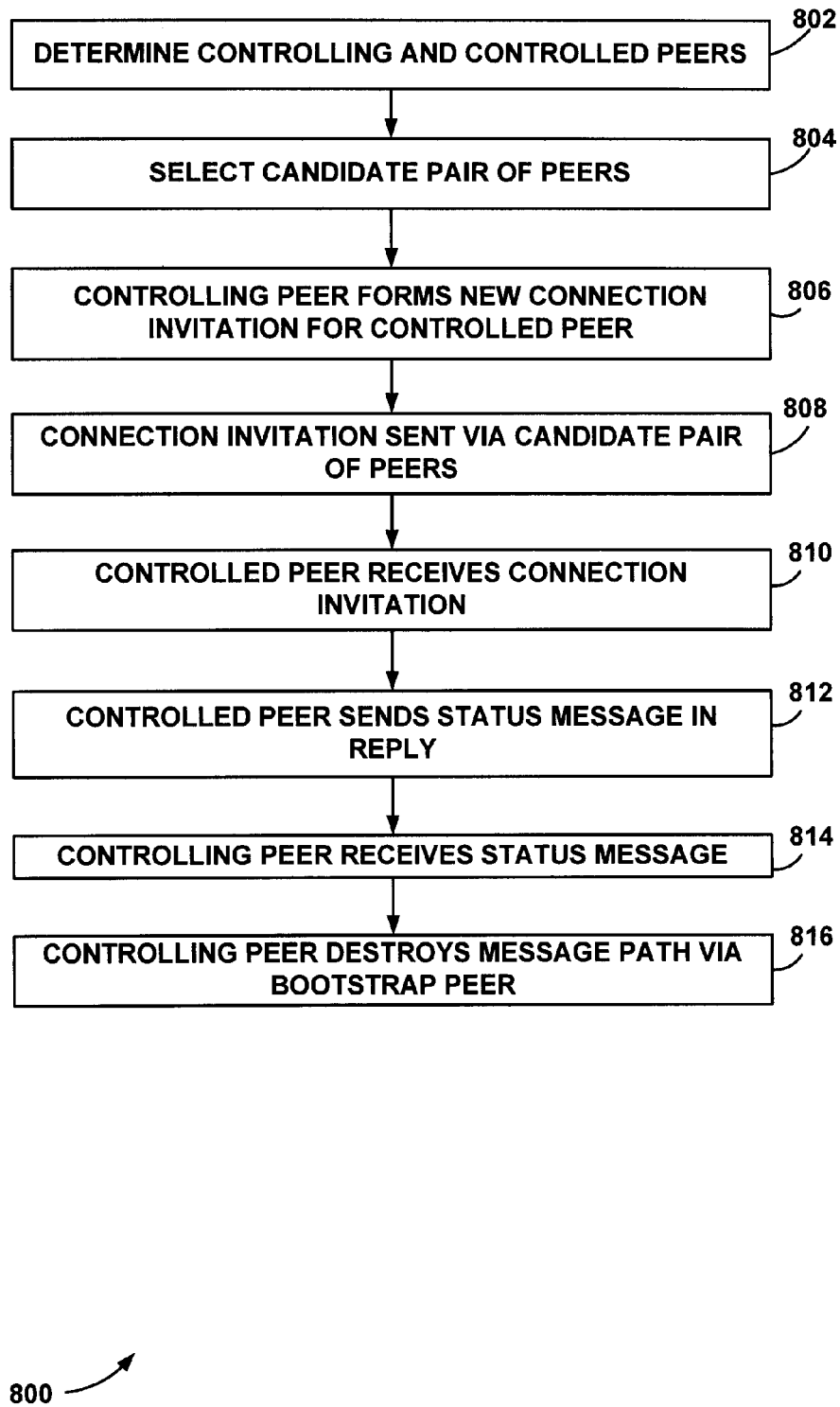
FIG. 7 illustrates portions of a bootstrapping process common to both the multicast process and the bootstrap server process.

The offer-answer exchange may be an SDP offer-answer exchange as described in 'SDP: Session Description Protocol", M. Handley, V. Jacobson, C. Perkins, RFC 4566, July 2006, http://www.ietf.org/rfc/rfc4566.txt (accessed on Feb. 19, 2007), and "An Offer/Answer Model with Session Description Protocol (SDP)", J. Rosenberg, H. Schulzrinne, RFC 3264, June 2002. http://www.ietf.org/rfc/rfc3264.txt (accessed on Feb. 19, 2007), both of which are incorporated herein by reference. The SDP offer may be contained in the initial invitation message and the SDP answer is contained in the ok response. Peers may use ICE (as described in "Interactive Connectivity Establishment (ICE): A Methodology for Network Address Translator (NAT) Traversal for Offer/Answer Protocols", J. Rosenberg, Jan. 16, 2007, http://tools.ietf.org/html/draft-ietf-mmusic-ice-13 (accessed on Feb. 19, 2007) (referred to as the ICE publication) and "TCP Candidates with Interactive Connectivity Establishment (ICE)", J. Rosenberg, Oct. 23, 2006, http://tools.ietf.org/html/draft-ietf-mmusic-ice-tcp-02 (accessed on Feb. 19, 2007), both of which are incorporated herein by reference) to determine a pair of transport addresses to use for the peer protocol connection During the offer/answer exchange, the joining peers and the admitting peer decide if ICE connectivity checks are run as shown in FIG. 7. The two peers select a controlling peer who will choose the candidate pair to use for the connection from amongst the working paths (step 802). A candidate pair is a pair of transport addresses, one for each end of the connection. A candidate pair is selected to ensure that packets get from one peer to another by sending from the local candidate and addressing the packet to the remote candidate. An exemplary method for selecting candidate pairs and an exemplary division between the controlling peer and the controlled peer is described in "Interactive Connectivity Establishment (ICE): A Methodology for Network Address Translator (NAT) Traversal for Offer/Answer Protocols", J. Rosenberg, Jan. 16, 2007, http://tools.ietf.org/html/draft-ietf-mmusic-ice-13 (accessed on Feb. 19, 2007).

The controlling peer selects a candidate pair of peers to use for the connection (step 804). The controlling peer then forms a new connection invitation message to send to the controlled peer (step 806). This connection invitation message is sent using the selected candidate pair (step 808); that is, it is sent on the control connection that is being set up. The purpose of this connection invitation message is to establish a new dialog that goes directly between the joining peer and the admitting peer, replacing the dialog that goes via the bootstrap peer (and the bootstrap server, if present). To this end, the pair for this new invitation message are be distinct from the pair used in the initial invitation message. This invitation message is sent using the selected candidate pair; that is, it is addressed to the remote candidate in the pair and sent from the local candidate in the pair. The remote peer is prepared to receive this invitation message.

When the controlled peer at the other end of the new connection receives the new invitation message (step 810), it replies with a status message indicating that the new connection has been established (step 812). This status message is sent back to the controlled peer along the same new control connection as it was received.

The receipt of the status message by the controlling peer (step 814) triggers the controlling peer to tear down the dialog (step 816) that goes via the bootstrap peer (and the bootstrap server if present). Note that the controlling peer may need to wait before destroying the message path through the bootstrap peer if there is an outstanding transaction (e.g. if the admitting peer receives the connection invitation for the new dialog before receiving the status message for the old dialog). Once the new connection transaction is completed, the control connection is ready for use as a peer protocol connection.

The method of FIG. 7 may be performed based on SIP and ICE. If this is the case then during the offer/answer exchange, both the joining peer and the admitting peer perform connectivity checks that are executed to find working transmission paths between the two peers. The connection invitation may be an INVITE message in which the request URI is the URI of the admitting peer and with the recipient field and the send and contact fields contain the joining peer URI.

The invitation message may contain a replaces header such as described in "The Session Initiation Protocol (SIP) "Replaces" Header" R. Mahy, B. Biggs, R. Dean. RFC 3891, September 2004, http://www.ietf.org/rfc/rfc3891.txt?number=3891 (accessed on Feb. 19, 2007), incorporated herein by reference, that specifies the dialog being replaced. The invitation message contains an updated offer. The Replaces header may include the call-id, to-tag and from-tag of the dialog established by the initial invitation message. This invitation message can serve both to carry the replace and to carry the updated offer. Once the invitation message is formed, it is sent on the candidate pair selected for the control connection.

If ICE is used then the status message may include the local candidate from the selected candidate pair and not any other candidates.

Keep-alive message may be run on the control connection to maintain it in the presence of NATs.

Credentials may be used to authorize different operations which form the bootstrap mechanisms described here.
1. The credentials required to send an invitation message through a bootstrap server to a bootstrap peer.
2. The credentials required to register a new overlay with a bootstrap peer and/or register a new contact for an existing overlay.
3. The credentials required to have a bootstrap peer proxy an invitation message through the overlay to the admitting peer.
4. The credentials required to set up a Peer Protocol connection for bootstrap purposes.

It may be that some of these will be collapsed together. Note that operations 1 and 2 are associated with the bootstrap server, while operations 3 and 4 are associated with the overlay. It is possible that the individual or group providing the bootstrap server is distinct and loosely associated with the group creating and using the overlay. In this case, the credentials for operations 1 and 2 may be very different from the credentials for operations 3 and 4. The credentials for operation 4 may be the same as those used to set up an arbitrary peer protocol connection.

It is apparent to one skilled in the art that numerous modifications and departures from the specific embodiments described herein may be made without departing from the spirit and scope of the invention.

The invention claimed is:
1. A method of bootstrapping a joining peer into a network overlay defining a peer-to-peer network, the method comprising:
 contacting a bootstrap peer to establish a connection between the joining peer and an admitting peer in the peer-to-peer network, the joining peer, the admitting peer and the bootstrap peer communicating via a peer protocol used only by peers in the peer-to-peer network, the peer protocol being used to maintain the network overlay of the peer-to-peer network;

receiving an indication from the bootstrap peer that the connection between the joining peer and the admitting peer has been established with a message path through the bootstrap peer, the indication including contact information for the admitting peer, the contact information containing an address for the admitting peer to enable the joining peer to contact the admitting peer directly;

modifying the connection to connect the joining peer to the admitting peer using the contact information; and communicating with the admitting peer over the modified connection to add the joining peer as a peer in the network overlay defining the peer-to-peer network.

2. The method according to claim 1 wherein contacting the bootstrap peer comprises:

sending a multicast message indicating a request to join the network overlay defining the peer-to-peer network;

receiving a reply to the multicast message from the bootstrap peer;

sending an invitation for establishing the connection to the bootstrap peer in response to the reply to the multicast message; and proxying, by the bootstrap peer, the invitation to the admitting peer.

3. The method according to claim 2 wherein sending the multicast message comprises:

sending the multicast message from the joining peer to a known multicast address.

4. The method according to claim 2 wherein sending the multicast message comprises:

sending the multicast message from the joining peer to any peers on a subnetwork with the joining peer.

5. The method according to claim 2 wherein receiving a reply comprises:

receiving a plurality of replies to the multicast message, each of the plurality of replies coming from a different peer in the peer-to-peer network; and selecting one peer from the peer-to-peer network to be the bootstrap peer based on the received plurality of replies to the multicast message.

6. The method according to claim 1 wherein modifying the connection comprises:

sending an invitation to the admitting peer using the contact information to replace the message path through the bootstrap peer with a direct message path between the joining peer and the admitting peer;

establishing the direct message path; and destroying the message path between joining peer and the admitting peer through the bootstrap peer.

7. The method according to claim 1 wherein contacting the bootstrap peer comprises:

sending a request to a bootstrap server to join the peer-to-peer network; and proxying, by the bootstrap server and the bootstrap peer, the request to the admitting peer.

8. The method according to claim 7 wherein proxying the request comprises:

forwarding the request from the bootstrap server to the bootstrap peer; and forwarding the request from the bootstrap peer to the admitting peer.

9. A method of bootstrapping a joining peer into a network overlay defining a peer-to-peer network, the method comprising:

sending, from the joining peer to a bootstrap peer, an invitation for establishing a connection between the joining peer and an admitting peer in the peer-to-peer network, the joining peer, the admitting peer and the bootstrap peer communicating via a peer protocol used only by peers in the peer-to-peer network, the peer protocol being used to maintain the network overlay of the peer-to-peer network;

sending, from the bootstrap peer to the admitting peer, the invitation from the joining peer;

replying, from the admitting peer to the joining peer through the bootstrap peer, to the invitation to confirm establishment of the connection, wherein a messaging path of the connection travels through the bootstrap peer;

sending, from the joining peer to the admitting peer, an invitation to replace the messaging path with a direct messaging path between the joining peer and the admitting peer in response to receipt of the reply at the joining peer; and establishing the direct message path;

destroying the messaging path between the joining peer and the admitting peer through the bootstrap peer; and communicating between the joining peer and the admitting peer over the modified connection to add the joining peer as a peer in the network overlay defining the peer-to-peer network.

10. The method according to claim 9 wherein sending the invitation to establish the connection comprises:

sending, from the joining peer, a multicast message indicating a request to join the network overlay defining the peer-to-peer network;

replying, from the bootstrap peer to the joining peer, to the multicast message; and sending, from the joining peer, the invitation for establishing the connection to the bootstrap peer in response to the reply to the multicast message.

11. The method according to claim 10 wherein sending the multicast message comprises:

sending the multicast message from the joining peer to a known multicast address.

12. The method according to claim 10 wherein sending the multicast message comprises:

sending the multicast message from the joining peer to any peers on a subnetwork with the joining peer.

13. The method according to claim 10 further comprising:

selecting, at the joining peer, one peer from the peer-to-peer network to be the bootstrap peer based a plurality of received replies to the multicast message, each of the plurality of replies coming from a different peer in the peer-to-peer network.

14. The method according to claim 9 wherein sending the invitation for establishing the connection comprises:

sending, from the joining peer, a request to a bootstrap server to join the peer-to-peer network; and forwarding the request from the bootstrap server to the bootstrap peer.

15. A method of bootstrapping a joining peer into a network overlay defining a peer-to-peer network, wherein Session Initiation Protocol (SIP) is used to establish connections between peers in the peer-to-peer network, the method comprising:

sending, from the joining peer to a bootstrap peer, an INVITE message requesting that a connection between the joining peer and an admitting peer in the peer-to-peer network be established, the joining peer, the admitting peer and the bootstrap peer communicating via a peer protocol used only by peers in the peer-to-peer network, the peer protocol being used to maintain the network overlay of the peer-to-peer network;

proxying the INVITE message from the bootstrap peer to the admitting peer;

proxying a response between the admitting peer and the joining peer through the bootstrap peer indicating that a working path between the joining peer and the admitting peer has been established through the bootstrap peer;

sending, from the joining peer to the admitting peer, a INVITE message with a Replaces header to replace the working path with a new working path directly between the joining peer and the admitting peer;

sending, between the admitting peer and the joining peer, a response to the INVITE message with the Replaces header indicating that the new working path has replaced the working path; and communicating between the admitting peer over the modified connection to add the joining peer as a peer in the network overlay defining the peer-to-peer network.

16. The method according to claim 15 further comprising:

multicasting, from the joining peer, an OPTIONS message indicating a request to join the network overlay defining the peer-to-peer network; and replying, from the bootstrap peer, to the multicast message.

17. The method according to claim 16 further comprising:

selecting, at the joining peer, one peer from the peer-to-peer network to be the bootstrap peer based a plurality of received replies to the multicast message, each of the plurality of replies coming from a different peer in the peer-to-peer network.

18. The method according to claim 15 wherein sending the INVITE message for establishing the connection comprises:

sending, from the joining peer, the INVITE message to a bootstrap server to join the peer-to-peer network; and proxying the request to the admitting peer.

19. The method according to claim 18 wherein proxying the request comprises:

forwarding the request from the bootstrap server to the bootstrap peer; and forwarding the request from the bootstrap peer to the bootstrap server.

20. A computer program product bootstrapping a joining peer into a network overlay defining a peer-to-peer network, the computer program product comprises at least one non-transitory computer-readable storage medium having computer-readable program code stored therein, the computer-readable program code comprising:

a first executable portion for contacting a bootstrap peer to establish a connection between the joining peer and an admitting peer in the peer-to-peer network, the joining peer, the admitting peer and the bootstrap peer communicating via a peer protocol used only by peers in the peer-to-peer network, the peer protocol being used to maintain the network overlay of the peer-to-peer network;

a second executable portion for receiving an indication from the bootstrap peer that the connection between the joining peer and the admitting peer has been established with a message path through the bootstrap peer, the indication including contact information for the admitting peer, the contact information containing an address for the admitting peer to enable the joining peer to contact the admitting peer directly; and a third executable portion for modifying the connection to connect the joining peer to the admitting peer using the contact information, and communicating with the admitting peer over the modified connection to add the joining peer as a peer in the network overlay defining the peer-to-peer network.

21. The computer program product according to claim 20 wherein the first executable portion comprises instructions for:

sending a multicast message indicating a request to join the network overlay defining the peer-to-peer network;

receiving a reply to the multicast message from the bootstrap peer;

sending an invitation for establishing the connection to the bootstrap peer in response to the reply to the multicast message; and proxying, by the bootstrap peer, the invitation to the admitting peer.

22. The computer program product according to claim 20 wherein the third executable portion comprises instructions for:

sending an invitation to the admitting peer using the contact information to replace the message path through the bootstrap peer with a direct message path between the joining peer and the admitting peer;

establishing the direct message path; and destroying the message path between joining peer and the admitting peer through the bootstrap peer.

23. The computer program product according to claim 20 wherein first executable portion comprises instructions for:

sending a request to a bootstrap server to join the peer-to-peer network; and proxying, by the bootstrap server and the bootstrap peer, the request to the admitting peer.

* * * * *